(12) United States Patent
Zhu et al.

(10) Patent No.: US 11,173,519 B2
(45) Date of Patent: Nov. 16, 2021

(54) RUBBER BLADE AND METHOD FOR MAKING THE SAME

(71) Applicant: SHENZHEN FANCY CREATION INDUSTRIAL LIMITED, Shenzhen (CN)

(72) Inventors: Hua Zhu, Shenzhen (CN); Hua Yang, Shenzhen (CN); Feng Hua, Shenzhen (CN); Hongnan Li, Shenzhen (CN); Naoyuki Ohmori, Shenzhen (CN)

(73) Assignee: SHENZHEN FANCY CREATION INDUSTRIAL LIMITED, Shenzhen (CN)

( * ) Notice: Subject to any disclaimer, the term of this patent is extended or adjusted under 35 U.S.C. 154(b) by 130 days.

(21) Appl. No.: 16/550,221

(22) Filed: Aug. 24, 2019

(65) Prior Publication Data
US 2020/0164404 A1 May 28, 2020

Related U.S. Application Data

(63) Continuation of application No. PCT/CN2018/117934, filed on Nov. 28, 2018.

(51) Int. Cl.
*B05D 7/02* (2006.01)
*B05D 1/00* (2006.01)
(Continued)

(52) U.S. Cl.
CPC ............. *B05D 7/02* (2013.01); *B05D 1/005* (2013.01); *B05D 1/02* (2013.01); *B05D 3/067* (2013.01);
(Continued)

(58) Field of Classification Search
CPC . B05D 7/02; B05D 1/005; B05D 1/02; B05D 3/067
See application file for complete search history.

(56) References Cited

U.S. PATENT DOCUMENTS

2009/0311017 A1* 12/2009 Ohmori .............. G03G 21/0017
399/350
2012/0163890 A1 6/2012 Uematsu et al.
(Continued)

FOREIGN PATENT DOCUMENTS

CN        101240058 A     8/2008
CN        101364076       2/2009
(Continued)

OTHER PUBLICATIONS

Periodic table of Elements. ptable.com/image/periodic-table.svg. (Year: 2021).*
(Continued)

*Primary Examiner* — Dah-Wei D. Yuan
*Assistant Examiner* — Kristen A Dagenais-Englehart

(57) ABSTRACT

The present application discloses a method for making a rubber blade. The method includes applying a first coating composition and a second coating composition in separate steps on at least a part of a surface of a polyurethane elastic substrate; and solidifying the first coating composition and the second coating composition by ultraviolet light irradiating to form a hardened layer on the surface of the polyurethane elastic substrate. The first coating composition includes an isocyanate-group-terminated polyisocyanate and a first solvent. The second coating composition includes a first monomer, a photoinitiator, and a second solvent. The first monomer is at least one of an acrylate monomer and a methacrylate monomer each having an reactive hydroxyl group. The isocyanate group of the polyisocyanate is reacted with the reactive hydroxyl group of the first monomer to generate a urethane group to form a polyurethane acrylate. The present application also discloses a rubber blade.

13 Claims, 2 Drawing Sheets

(51) Int. Cl.
  *B05D 1/02* (2006.01)
  *B05D 3/06* (2006.01)
(52) U.S. Cl.
  CPC ...... *B05D 2201/02* (2013.01); *B05D 2320/00* (2013.01); *B05D 2502/005* (2013.01); *B05D 2503/00* (2013.01)

(56) References Cited

U.S. PATENT DOCUMENTS

| | | |
|---|---|---|
| 2016/0297989 A1 | 10/2016 | Nimura et al. |
| 2016/0313690 A1* | 10/2016 | Kimura .............. G03G 21/0017 |
| 2017/0275430 A1 | 9/2017 | Kube et al. |

FOREIGN PATENT DOCUMENTS

| | | | |
|---|---|---|---|
| CN | 101604138 A | 12/2009 | |
| CN | 102087502 A | 6/2011 | |
| CN | 103118868 A | 5/2013 | |
| CN | 106255926 A | 12/2016 | |
| CN | 107226920 A | 10/2017 | |
| CN | 107430375 A | 12/2017 | |
| JP | 2011-138031 | 7/2011 | |
| JP | 2011-180424 | 9/2011 | |
| JP | 2011185984 | 9/2011 | |
| JP | WO2018061762 A1 | 9/2018 | |
| KR | 1020160141837 | 12/2016 | |
| WO | WO-2015156110 A1 * | 10/2015 | ......... G03G 21/0017 |
| WO | WO2018138968 | 8/2018 | |

OTHER PUBLICATIONS

International Search Report of PCT/CN2018/117934.
First Office Action of CN CN201880002507.7.
First Office Action of JP2019-545253, dated Mar. 23, 2021.

* cited by examiner

RUBBER BLADE AND METHOD FOR MAKING THE SAME

CROSS-REFERENCE TO RELATED APPLICATIONS

This application is a continuation under 35 U.S.C. § 120 of international patent application PCT/CN2018/117934 filed on Nov. 28, 2018, the content of which is also hereby incorporated by reference.

FIELD

The present disclosure relates to rubber blades and methods for making the same.

BACKGROUND

A polyurethane elastomer made squeegee, with a good elasticity and a hardness that is easy to regulate, is widely used in the cleaning of water and oil from a flat surface of an object to be cleaned, in degassing between laminated films, and in cleaning toner remaining on a photosensitive drum of a laser printer. The polyurethane elastomer can be prepared by reacting a polyisocyanate with a polyoxyalkylene polyol and/or a polyester polyol in addition with related catalysts and other required auxiliary agents. For example, an isocyanate-terminated prepolymer can be firstly formed by reacting methylene diphenyl diisocyanate (MDI) or polymethylene polyphenyl polyisocyanate (p-MDI) with polyoxypropylene polyol (PPG) or polyester polyol (PES), wherein PPG can be formed from a ring-opening polymerization between an alkylene oxide such as ethylene oxide or propylene oxide and an initiator having a reactive hydroxyl group, and PES can be formed from a polymerization between a glycol, such as ethylene glycol or propylene glycol, and a diprotic acid such as hexanedioic acid. Then the isocyanate-terminated prepolymer can be mixed with a catalyst and a short-chain polyol, which is a cross-linking agent and a chain extender. The mixture can be cast into a preheated centrifugal molding machine in which the mixture is hardened into a polyurethane elastomer sheet, and then the sheet is cut into shapes that are suitable for the squeegees.

The squeegee performs the cleaning of the liquid or powder on the object by adopting an edge of a rubber substrate as a working portion. In order to ensure the accuracy of the edge and achieve a better cleaning effect, the rubber member of the squeegee, especially the working portion of the rubber member, should have relatively good elasticity and wear resistance.

In related art, an acrylate or methacrylate monomer is applied to the working portion of the rubber substrate and the coating cured in ultraviolet light to improve the wear resistance. However, the cured coating is hard and brittle, the physical properties, such as the stretchability, of the cured coating being not as good as that of the rubber substrate itself. Therefore, when the rubber substrate itself is deformed, the conformability of the coated surface is poor, and issues like slits and cracks may occur.

SUMMARY

What is needed, therefore, is to provide a rubber blade and a method for making the same, the rubber blade having a relatively good abrasion resistance and an abrasion resistant layer with relatively good conformability.

A method for making a rubber blade can comprise applying a first coating composition and a second coating composition in separate steps on at least a part of a surface of a polyurethane elastic substrate. The first coating composition comprises an isocyanate-group-terminated polyisocyanate and a first solvent, the second coating composition comprises a first monomer, a photoinitiator, and a second solvent, and the first monomer is at least one of an acrylate monomer and a methacrylate monomer each having an reactive hydroxyl group. The method can further comprise reacting the isocyanate group of the polyisocyanate with the reactive hydroxyl group of the first monomer to generate an urethane group, thereby forming a polyurethane acrylate. The method can further comprise solidifying the first coating composition and the second coating composition by ultraviolet light irradiating to form a hardened layer on the surface of the polyurethane elastic substrate.

In an embodiment, a weight percentage of NCO in the polyisocyanate is 5% to 30%.

In an embodiment, the polyisocyanate is a prepolymer obtained by reacting an isocyanate monomer with a polymer polyol, a number average molecular weight of the polymer polyol is less than or equal to 8000.

In an embodiment, the number average molecular weight of the polymer polyol is 200 to 4000.

In an embodiment, the polymer polyol comprises at least one of polyoxyalkylene polyol and polyester polyol.

In an embodiment, a functionality of the polymer polyol is 2 to 5.

In an embodiment, a weight ratio of the polyisocyanate to the first solvent is 90:10 to 10:90, and a weight ratio of the first monomer to the second solvent is 70:30 to 95:5.

In an embodiment, the second coating composition further comprises a second monomer, the second monomer is at least one of an acrylate monomer and a methacrylate monomer each not having any reactive hydroxyl group.

In an embodiment, at least one of the first coating composition and the second coating composition further comprises at least one of a catalyst, a flame retardant, a plasticizer, an antioxidant, a colorant, and a filler.

In an embodiment, the applying the first coating composition and the second coating composition in separate steps on at least a part of the surface of the polyurethane elastic substrate comprises firstly applying the first coating composition on the surface, and then applying the second coating composition on the surface having the first coating composition, or firstly applying the second coating composition on the surface, and then applying the first coating composition on the surface having the second coating composition.

In an embodiment, after applying one and before applying another of the first coating composition and the second coating composition, the method further comprises removing an excess coating composition from the surface.

In an embodiment, the applying is respectively dip-coating the surface of the polyurethane elastic substrate with the first coating composition and the second coating composition.

In an embodiment, the surface of the polyurethane elastic substrate is stayed in the first coating composition and the second coating composition for 1 minute to 60 minutes.

In an embodiment, the reacting the isocyanate group with the reactive hydroxyl group and the solidifying the polyurethane acrylate are proceeded in a same ultraviolet light irradiating step in heat generated by the ultraviolet light irradiating.

In an embodiment, at least one of the first coating composition and the second coating composition is applied at a temperature above room temperature.

In an embodiment, the polyurethane elastic substrate has an edge configured to be in contact with an operating target surface, the at least a part of the surface is adjacent to the edge.

A rubber blade can comprise a polyurethane elastic substrate and a hardened layer disposed on at least a part of a surface of the polyurethane elastic substrate, wherein at least a portion of the hardened layer infiltrates into the polyurethane elastic substrate from the surface and composites with at least a portion of the polyurethane elastic substrate, the hardened layer is formed by solidifying a polyurethane acrylate.

In an embodiment, a shore A hardness difference between a compositing portion of the polyurethane elastic substrate with the hardened layer and a non-compositing portion of the polyurethane elastic substrate is 1% to 8%.

In an embodiment, the surface having the hardened layer or the edge adjacent to the surface of the polyurethane elastic substrate is capable of moving along an operating target surface and applying a force to the operating target surface.

In the method for making the rubber blade of the present application, by separately applying the first coating composition and the second coating composition on the surface of the polyurethane elastic substrate, the first coating composition containing the polyisocyanate, the second coating composition containing the acrylate monomer and/or the methacrylate monomer each having the reactive hydroxyl group, and the polyurethane elastic substrate being used as a rubber substrate, the reaction between the isocyanate group of the polyisocyanate and the reactive hydroxyl group of the acrylate and/or methacrylate monomer is occurred after the two compositions are applied to the polyurethane elastic substrate. As viscosities of the two compositions are relatively low, a permeability of the compositions to the polyurethane elastic substrate is improved, and at least a portion or an entire of the hardened layer formed from the solidification can enter the polyurethane elastic substrate and composite with the polyurethane elastic substrate, thereby improving an abrasion resistance of the applied portion and a conformability of the rubber blade. By applying the two compositions having low viscosities in separate steps, the material can be infiltrated into the substrate in a short time, such that workability and production efficiency can be improved. The isocyanate group in the first coating composition and the hydroxyl group in the first monomer are reacted to generate a polyurethane acrylate structure. Meanwhile, the acrylate and/or methacrylate structure can have a free-radical polymerization or ionic polymerization in a short time thereby being solidified to form the hardened layer. The rubber blade of the present application has a relatively good abrasion resistance, and does not easily form defects in use such as slits and cracks.

BRIEF DESCRIPTION OF THE DRAWINGS

In order to clearly explain technical solutions of the present application, drawings to be referred in the embodiments will be briefly described below. Obviously, the drawings in the following description only show some embodiments of the present application, and those skilled in the art can obtain other drawings according to the following drawings without any creative work.

DETAILED DESCRIPTION

In order to clearly explain technical solutions of the present application, the technical solutions of the present application will be described in detail below with reference to the accompanying drawings and embodiments. It should be understood that the specific embodiments are not intended to limit the application.

Figure 1:
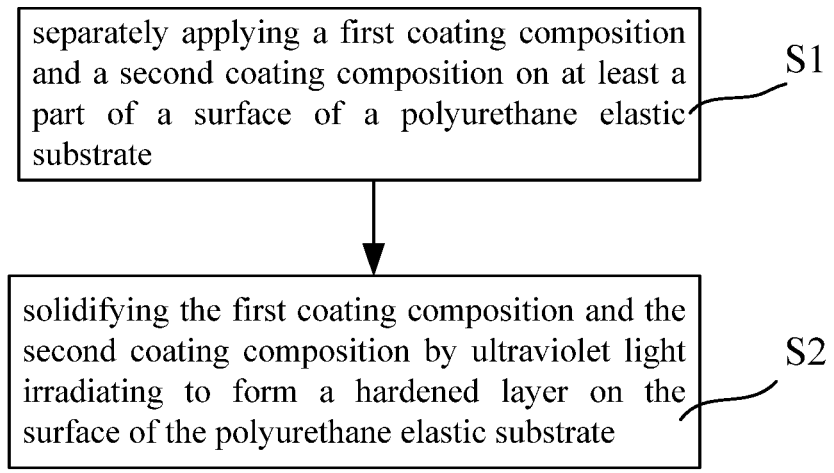
FIG. 1 shows a flow chart of an embodiment of a method for making a rubber blade.

Referring to FIG. 1, an embodiment of the present application provides a method for making a rubber blade, comprising applying a first coating composition and a second coating composition in separate steps on at least a part of a surface of a polyurethane elastic substrate, wherein the first coating composition comprises an isocyanate-group-terminated polyisocyanate and a first solvent, and the second coating composition comprises a first monomer, the first monomer being at least one of an acrylate monomer and a methacrylate monomer each having an reactive hydroxyl group, a photoinitiator, and a second solvent. The method can further include reacting the isocyanate group of the polyisocyanate with the reactive hydroxyl group of the first monomer to generate an urethane group to form a polyurethane acrylate, and solidifying the first coating composition and the second coating composition by ultraviolet light irradiating to form a hardened layer on the surface of the polyurethane elastic substrate.

In the method for making the rubber blade of the present application, by separately applying the first coating composition and the second coating composition on the surface of the polyurethane elastic substrate, the first coating composition containing the polyisocyanate, the second coating composition containing the acrylate monomer and/or the methacrylate monomer each having the reactive hydroxyl group, and the polyurethane elastic substrate being used as a rubber substrate, the reaction between the isocyanate group of the polyisocyanate and the reactive hydroxyl group of the acrylate and/or methacrylate monomer is occurred after the two compositions are applied to the polyurethane elastic substrate. As viscosities of the two compositions are relatively low, a permeability of the compositions to the polyurethane elastic substrate is improved, and at least a portion or an entire of the hardened layer formed from the solidification can enter the polyurethane elastic substrate and composite with the polyurethane elastic substrate, thereby improving an abrasion resistance of the applied portion and a conformability of the rubber blade. By applying the two compositions having low viscosities in separate steps, the material can be infiltrated into the substrate in a short time, such that workability and production efficiency can be improved. The isocyanate group in the first coating composition and the hydroxyl group in the first monomer are reacted to generate a polyurethane acrylate structure. A relatively long time for the solidification at a relatively high temperature is required and the improvement of the abrasion resistance is not significant if simply applying the polyisocyanate monomer. Compared to this, the polyurethane acrylate of the present application is a structure having the polyisocyanate terminated by the acrylate and/or methacrylate group, which can have a free-radical polymerization or ionic polymerization in a short time thereby being solidified to form the hardened layer. The rubber blade of the present application has a relatively good abrasion resistance, and is not easy to form defects in use such as slits and cracks.

The polyurethane elastic substrate is used as a rubber substrate, having an edge that is to be in contact with an operating target surface, and having at least one surface that is adjacent to the edge. The edge of the polyurethane elastic substrate or the surface adjacent to the edge of the polyurethane elastic substrate moves along the operating target surface and applying a force to the operating target surface in a process including but not limited to cleaning the surface to be cleaned, removing gas between laminated films, or screen printing. In an embodiment, the polyurethane elastic substrate is a bar like rectangular cuboid having a length, a width, and a thickness. The edge can be in the length direction. The first coating composition and the second coating composition can be applied in separate steps on the surface of the substrate adjacent to the edge. In the following description, the surface that is applied (e.g., dip-coated or impregnated) with the first coating composition and the second coating composition is also named as "processing surface" or "dip-coating surface". It can be noted that, dip-coating may be used as an exemplary way of the applying of the first coating composition and the second coating composition, however, the applying is not limited to dip-coating, but can be other methods or ways, such as spraying, knife coating, spin coating, etc.

Take the cleaning as an example, if the shore A hardness of the polyurethane elastomer which is used as the rubber substrate is larger than 80°, the flexibility of the material decreases and the conformability of the edge toward the surface to be cleaned decreases, that is to say, the ability of the edge of the substrate having it's shape conformed with the shape of the surface to be cleaned decreases. If the shore A hardness of the polyurethane elastomer is smaller than 30°, the material is too soft to provide enough force to the surface to be cleaned, such that the cleaning performance of the rubber blade decreases. If the modulus of repulsion elasticity of the polyurethane elastomer is larger than 85%, repulsion of the polyurethane elastomer increases during the cleaning action, leading the cleaning non-uniform. If the modulus of repulsion elasticity of the polyurethane elastomer is smaller than 20%, the working portion (e.g., the edge of the substrate) that is in contact with the surface to be cleaned has a slow deformation recovery speed, leading a decrease of the cleaning performance of the rubber blade. In an embodiment, the polyurethane elastic substrate has a shore A hardness in a range from 30° to 80° and a modulus of repulsion elasticity in a range from 20% to 85%.

In the first coating composition, the polyisocyanate can be a prepolymer obtained by reacting an isocyanate monomer with a polymer polyol. By controlling a ratio of the isocyanate monomer to the polymer polyol, the polyisocyanate can be terminated by an isocyanate group (NCO). By also controlling the ratio of the isocyanate monomer to the polymer polyol, a weight percentage of NCO (NCO %) in the polyisocyanate can be controlled in a range from 5% to 30%. When the NCO % is below 5%, a viscosity of the polyisocyanate increases, being difficult to infiltrate into the polyurethane elastic substrate and decreasing a permeability of the dip-coating step. When the NCO % is above 30%, the amount of the polyol is not enough, leading a decrease of the conformability of the rubber blade toward the surface to be cleaned.

The polymer polyol can comprise at least one of polyoxyalkylene polyol and polyester polyol. A relatively high molecular weight of the polymer polyol will induce an increase of the viscosity of the polyisocyanate and a decrease of the permeability. If a functionality of the polymer polyol is smaller than 2, the polymer polyol is difficult to be cross-linked with the isocyanate monomer, inducing a decrease of the physical properties of the polyisocyanate, such that the abrasion resistance of the rubber blade will significant decrease. However, an over large functionality of the polymer polyol will also increase the viscosity of the polyisocyanate and decrease the permeability. In some embodiments, the functionality of the polymer polyol is larger than or equal to 2. In an embodiment, the functionality of the polymer polyol is 2 to 5. In some embodiments, a number average molecular weight of the polymer polyol is less than or equal to 8000 such that the polyisocyanate has a relatively small viscosity to achieve a high permeability that the polyisocyanate is easy to be infiltrated into the polyurethane elastic substrate. In an embodiment, the number average molecular weight of the polymer polyol is 200 to 4000. The polyoxyalkylene polyol can be formed from a ring-opening polymerization between an alkylene oxide such as ethylene oxide or propylene oxide and an initiator having a reactive hydroxyl group. The polyester polyol can be formed from a polymerization between a glycol, such as ethylene glycol or propylene glycol, and a diprotic acid, such as a hexanedioic acid.

The isocyanate monomer per molecule comprises two or more isocyanato groups. The isocyanate monomer can be one or more of an aliphatic isocyanate, an alicyclic isocyanate, an aromatic isocyanate, and an aromatic-aliphatic isocyanate. The isocyanate monomer can be selected from, but not limited to, one or more of hexamethylene diisocyanate, methylpentane diisocyanate, trimethylhexamethylene diisocyanate, tetramethylene diisocyanate, hexamethylene diisocyanate, isophorone diisocyanate, bis(isocyanatomethyl)cyclohexane, toluene diisocyanate, p-phenylene diisocyanate, m-phenylene diisocyanate, naphthalene diisocyanate, dimethylphenyl diisocyanate, dimethyl biphenyl diisocyanate, methylene diphenyl diisocyanate (MDI), and polymethylene polyphenyl polyisocyanate (p-MDI).

In one embodiment, the polyisocyanate is a NCO-terminated prepolymer obtained from mixing of MDI and p-MDI and modifying with a polyoxyalkylene polyol and/or a polyester polyol. The ratio of the MDI to the p-MDI is not particularly limited and can be any ratio.

The first solvent can be any solvent that is capable of diluting the polyisocyanate, and the polyisocyanate can be dissolved or uniformly dispersed in the first solvent. The first solvent, for example, can be selected from at least one of a ketone solvent, an ester solvent, and an ether solvent, such as one or more of ethyl acetate, butyl acetate, 3-methoxybutyl acetate, acetone, 2-butanone, 4-methyl-2-pentanone, methyl ethyl ketone, cyclohexanone, toluene, xylene, and chlorobenzene. In one embodiment, the first solvent is selected from the solvents that do not react with the polyisocyanate to cause a decrease in functionality of the polyisocyanate, such as the first solvent does not contain a reactive hydroxyl group. A weight ratio of the polyisocyanate to the first solvent can be ranged from 90:10 to 10:90, and in an embodiment from 30:70 to 40:60. When a proportion of the solvent in the first coating composition is too high, for example, more than 90%, the solvent may infiltrate into the polyurethane elastic substrate causing a swelling of the polyurethane elastic substrate, which will reduce the processing precision of the edge, resulting a decrease of the cleaning performance of the rubber blade. In addition, a low content of the polyisocyanate in the first coating composition is unfavorable for increasing the efficiency of the dip-coating step, requiring a longer dip-coating time.

In the second coating composition, each molecule of the first monomer contains one or more active hydroxyl groups. The reactive hydroxyl group is a hydroxyl group capable of reacting with an NCO group to form a urethane group. The acrylate monomer and/or the methacrylate monomer each containing the active hydroxyl group can be exemplified, but not limited to, at least one of mono-2-(acryloyloxy)ethyl succinate, 3-(acryloyloxy)-2-hydroxypropyl methacrylate, pentaerythritol triacrylate, glyceryl dimethacrylate, 2-hydroxyethyl acrylate, 2-hydroxyethyl methacrylate, 2-hydroxypropyl acrylate, 2-hydroxypropyl methacrylate, and 4-hydroxybutyl acrylate.

In an embodiment, in order to adjust the viscosity or adjust the physical properties of the hardened layer after the solidifying, the first coating composition and/or the second coating composition can further include a second monomer. In an embodiment, the second coating composition further comprises the second monomer. The second monomer is a monomer that does not contain any reactive hydroxyl group and is capable of having a polymerization with the first monomer under the condition of the solidifying step. In an embodiment, the second monomer is at least one of an acrylate monomer and a methacrylate monomer that does not contain any reactive hydroxyl group. The acrylate monomer and/or methacrylate monomer not containing any reactive hydroxyl group can be selected from, but not limited to, one or more of methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, 2-ethylhexyl acrylate, 2-ethylhexyl methacrylate, lauryl acrylate, lauryl methacrylate, 1,10-dodecanol diacrylate, 1,6-hexanediol diacrylate, tricyclodecane dimethanol acrylate.

The second solvent can be any solvent that is capable of diluting the first monomer, and the first monomer can be dissolved or uniformly dispersed in the second solvent. The second solvent, for example, can be selected from at least one of a ketone solvent, an ester solvent, and an ether solvent, such as one or more of ethyl acetate, butyl acetate, 3-methoxybutyl acetate, acetone, 2-butanone, 4-methyl-2-pentanone, methyl ethyl ketone, cyclohexanone, toluene, xylene, and chlorobenzene. In one embodiment, the second solvent is selected from the solvents that do not react with the first monomer and/or the polyisocyanate to cause a decrease in functionality of the polyisocyanate, such as the second solvent does not contain a reactive hydroxyl group. A weight ratio of the first monomer to the second solvent can be ranged from 70:30 to 95:5, and in an embodiment from 75:20 to 85:10. When a proportion of the solvent in the second coating composition is too high, for example, more than 95%, the solvent may infiltrate into the polyurethane elastic substrate causing a swelling of the polyurethane elastic substrate, which will reduce the processing precision of the edge, resulting a decrease of the cleaning performance of the rubber blade. In addition, a low content of the first monomer in the second coating composition is unfavorable for increasing the efficiency of the dip-coating step, requiring a longer dip-coating time.

The second coating composition can further comprise a photoinitiator. The photoinitiator is a compound that is capable of polymerizing the first monomer under an ultraviolet light irradiation thereby solidifying the acrylate/methacrylate coating composition. The photoinitiator can be, for example, a free-radical polymerization photoinitiator, a cationic polymerization photoinitiator, or an anionic polymerization photoinitiator. More specifically, the photoinitiator can be selected from, but not limited to, at least one of 2,2-dimethyl-α-hydroxyethylketone, (2,4,6-trimethylbenzoyl)diphenylphosphine oxide, benzoyl peroxide, methylcyclohexanone peroxide, and azobisisobutyronitrile (AIBN). An amount of the photoinitiator to be added can be varied depending on the physical properties to be achieved for the hardened layer or the solidifying conditions, and is not particularly limited.

In an embodiment, in order to promote the reaction between the polyisocyanate and the first monomer, at least one of the first coating and the second coating can further comprise a catalyst. The catalyst can be selected from, but not limited to at least one of a tertiary amine such as trimethylamine, tripropylamine, tributylamine, N-ethylmorpholine, N,N-dimethylbenzylamine, N,N,N',N'-tetramethyl-1,6-hexanediamine, triethylenediamine, 1-butyl-2-methylimidazole; a reactive amine such as dimethylethanolamine and N,N-dimethyl-N-hexanolamine; and an organometallic compound such as dibutyltin dilaurate, stannous octoate, di-n-butylbis(dodecylthio)tin, and dibutyltin diacetate.

In an embodiment, at least one of the first coating composition and the second coating composition can further comprise an auxiliary agent which can be at least one of a catalyst, a flame retardant, a plasticizer, an antioxidant, a colorant, and a filler. The auxiliary agent can be comprised by the first coating composition or the second coating composition if the auxiliary agent does not have a reactive group capable of reacting with the first coating composition or the second coating composition.

The applying in separate steps means that the first coating composition and the second coating composition are not applied at the same time period, that is, at different stages, completing the applying of one composition and then applying the other composition. The first coating composition and the second coating composition are applied on the same surface of the polyurethane elastic substrate, that is, the compositions are applied to the same location. The order of the applying of the first coating composition and the second coating composition is not limited if only the two compositions are not applied at the same time. In an embodiment, the applying the first coating composition and the second coating composition in separate steps on the surface of the polyurethane elastic substrate comprises firstly applying the first coating composition on the surface, and then applying the second coating composition on the surface having the first coating composition. In another embodiment, the applying the first coating composition and the second coating composition in separate steps on the surface of the polyurethane elastic substrate comprises firstly applying the second coating composition on the surface, and then applying the first coating composition on the surface having the second coating composition.

The applying can be respectively dip-coating the processing surface of the polyurethane elastic substrate with the first coating composition and the second coating composition. For example, the processing surface of the polyurethane elastic substrate is immersed in one of the first coating composition and the second coating composition for a pre-determined time period, then taken out from such composition, and immersed in the other of the first coating composition and the second coating composition for a pre-determined time period, and then taken out from such composition.

In an embodiment, an excess coating composition can be removed from the surface after applying (such as dip-coating) one of the first coating composition and the second coating composition and before applying another of the first coating composition and the second coating composition, to achieve a relatively smooth and flat surface after the dip-coating, thereby having a relatively good contact between the edge adjacent to the surface and the surface to be cleaned. The removing of the excess coating composition can be scraping, wiping, solvent cleaning, air stream blowing, and more specifically, for example, scraped off with a doctor blade or wiped off with a fabric.

The dip-coating time, which is the time for the surface of the polyurethane elastic substrate staying in each of the first coating composition and the second coating composition can be ranged from 1 minute to 60 minutes, and in an embodiment is ranged from 5 minutes to 30 minutes. If the dip-coating time for the first coating composition is less than 1 minute, the amount of the polyisocyanate infiltrated into the polyurethane elastic substrate is relatively small, not suitable for improving the conformability of the rubber blade. If the dip-coating time for the second coating composition is less than 1 minute, the amount of the acrylate/methacrylate monomer infiltrated into the polyurethane elastic substrate is relatively small, not suitable for improving the abrasion resistance of the rubber blade. If the dip-coating time for the first coating composition or the second coating composition is beyond 60 minutes, an excess amount of the solvent will be infiltrated into the polyurethane elastic substrate, inducing a swelling of the polyurethane elastic substrate by the solvent and a decreasing of the processing precision of the edge, resulting a decrease of the cleaning performance of the rubber blade. Besides, the dip-coating time is also related to a concentration of the first coating composition or the second coating composition. The larger the proportion of the solvent in the first coating composition or the second coating composition, the less the dip-coating time, and vice versa.

It can be understood that, except the dip-coating, the first coating composition and the second coating composition can be applied to the surface and maintained for a period of time in separate steps by other means such as spraying, knife coating, or spin coating to infiltrate the polyisocyanate and the first monomer into the polyurethane elastic substrate. After each step of applying the first coating composition and applying the second coating composition by the other means, the excess coating compositions attached to the processed surface can also be removed by the same method as described above.

Since micropores or gaps are defined by the polymer molecular network of the polyurethane elastic substrate, the polyisocyanate in the first coating composition and the first monomer in the second coating composition can infiltrate from the processing surface into an interior of the polyurethane elastic substrate, compositing a portion of the polyurethane elastic substrate adjacent to the processing surface. By applying the first coating composition and the second coating composition in separate steps on the same surface of the polyurethane elastic substrate, the first coating composition can react with the second coating composition in the polyurethane elastic substrate to form the polyurethane acrylate compositing with the polyurethane elastic substrate. That is, in the embodiments of the present application, the polyurethane acrylate is formed in situ in the polyurethane elastic substrate by separately applying the first coating composition and the second coating composition. The polyurethane acrylate is a polymer with a relatively large viscosity. If directly applying the polyurethane acrylate, the polyurethane acrylate with the large viscosity is difficult to infiltrate into the polyurethane elastic substrate, such that the polyurethane acrylate is difficult to be firmly combined with the polyurethane elastic substrate, resulting a poor workability. These problems can be avoided by separately applying reactants, namely the first coating composition and the second coating composition, for synthesizing the polyurethane acrylate, thereby taking the merit that the polyisocyanate and the first monomer as the reactants have small viscosities, and are easy to infiltrate into the polyurethane elastic substrate.

Optionally, in order to further reduce the viscosity of the first coating composition and/or the second coating composition and increase the amount of the compositions infiltrated in the substrate, the dip-coating operation can be carried out at a temperature higher than room temperature. The specific temperature is not limited, and can be decided according to a requirement for the performance of the product and the heat resistance of the rubber substrate material. In an embodiment, the temperature above room temperature can be in a range from 30° C. to 90° C., and in some embodiments, can be in a range from 70° C. to 80° C. Specifically, at least one of the first coating composition, the second coating composition, and the polyurethane elastic substrate can be heated to the temperature higher than the room temperature, and then the steps of applying the coating compositions can be performed. Alternatively, after the applying of the first coating composition and/or the second coating composition, the coating composition is then heated to the temperature above the room temperature along with the polyurethane elastic substrate.

In an embodiment, the heat generated by the ultraviolet light irradiation can be used to cause the reaction between the isocyanate group of the polyisocyanate and the reactive hydroxyl group of the first monomer to obtain the acrylate and/or methacrylate structure terminated polyurethane acrylate. Therefore, the reaction of the isocyanate group with the reactive hydroxyl group and the solidifying of the polyurethane acrylate can be carried out in the same ultraviolet light irradiation step.

The light irradiation can be, for example, the ultraviolet light irradiation. The acrylate and/or methacrylate structure can have a free-radical polymerization or an ionic polymerization by irradiating the processing surface of the polyurethane elastic substrate with the ultraviolet light, through which the polyurethane acrylate is cross-linking polymerized to form a solidified high molecular polymer being the material of the hardened layer. In an embodiment, after removing the excess coating composition from the surface of the polyurethane elastic substrate, a high pressure mercury lamp or a metal halide lamp is used to irradiate the surface of the polyurethane elastic substrate applied with the first and second coating compositions in the separate steps with the ultraviolet light to cause a urethanization reaction and a solidifying reaction of the reactive functional group infiltrated in the polyurethane elastic substrate to form the hardened layer. Since both the polyisocyanate and the first monomer infiltrate into the interior of the polyurethane elastic substrate, the cross-linking polymerization reaction occurring in the light solidifying step also occurs substantially inside the polyurethane elastic substrate. More specifically, the reaction occurs in a region extending to a certain depth from the processing surface to the inside of the substrate. The resulted hardened layer is at least partially or wholly composited with the polymeric network of the polyurethane elastomeric substrate.

The polyurethane elastomer having the hardened layer obtained by the above-described method can be directly used as a rubber blade or the substrate of the rubber blade.

Optionally, the surface or the edge having the hardened layer can be processed such as ground to obtain better dimensional accuracy.

Figure 2:
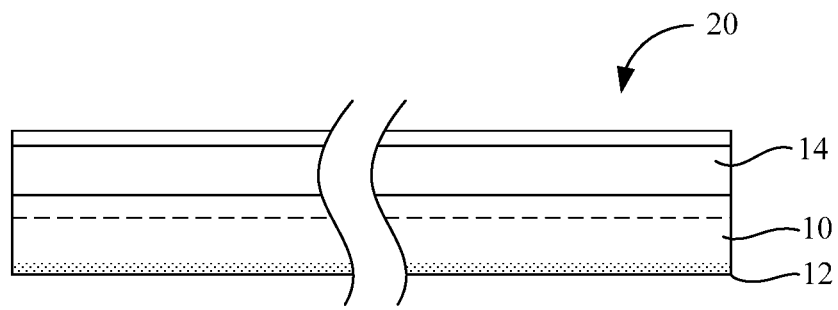
FIG. 2 is a schematic front view of an embodiment of the rubber blade.
Figure 3:
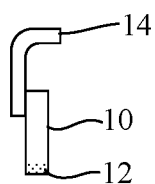
FIG. 3 is a schematic side view of an embodiment of the rubber blade.

Referring to FIG. 2 and FIG. 3, an embodiment of the present application further provides a rubber blade 20, which can be, for example, a scraper or a squeegee. The rubber blade 20 can be made by the above-described method. The rubber blade 20 comprises a polyurethane elastic substrate 10 and a hardened layer 12 disposed on at least a part of a surface of the polyurethane elastic substrate 10. At least a portion of the hardened layer 12 infiltrates into the polyurethane elastic substrate 10 from the surface, and is composited with at least a portion of the polyurethane elastic substrate 10. The hardened layer 12 is formed from the solidifying of the polyurethane acrylate.

After being composited with the hardened layer 12, the polyurethane elastic substrate 10 can have two portions, a portion that is composited with the hardened layer 12 and a portion that is not composited with the hardened layer 12. A difference between the shore A hardness of the two portions can be ranged from 1% to 8%, and in an embodiment ranged from 1% to 4%. The hardness difference is (A1−A2)/A1*100%, wherein A1 represents the hardness of the polyurethane elastic substrate 10, and A2 represents the hardness of the hardened layer 12. When the Shore A hardness difference is small, for example, less than 1%, the improvement on abrasion resistance of the rubber blade brought by the dip-coating is poor. When the Shore A hardness difference is large, for example, more than 8%, the conformability of the hardened layer 12 is lowered when the polyurethane elastic substrate 10 is deformed, and it is easy to leave traces of the deformed processing surface on the surface to be cleaned.

In an embodiment, the rubber blade 20 further comprises a rigid support 14 supporting the polyurethane elastic substrate 10, and the rigid support 14 can be mounted on one end of the polyurethane elastic substrate 10 away from the hardened layer 12.

The surface having the hardened layer 12 of the polyurethane elastic substrate 10 or the edge adjacent to the surface of the polyurethane elastic substrate 10 is capable of moving along the operating target surface and applying a force to the operating target surface in a process including but not limited to cleaning of water and oil on a flat surface of an object to be cleaned, degassing between laminated films, and cleaning of toner remained on a photosensitive drum of a laser printer. In an embodiment, the rubber blade 20 is configured to have the surface having the hardened layer 12 of the polyurethane elastic substrate 10 or the edge adjacent to the surface of the polyurethane elastic substrate 10 move along the operating target surface to clean the residue on the surface to be cleaned, such as at least one of water, oil, and powder.

In the following examples and comparative examples, "%" means "% by mass", and "ratio" means "weight ratio". The materials used in the examples and comparative examples are firstly described.

[Rubber Substrate]

The rubber substrate can be prepared by mixing a polyurethane prepolymer and a crosslinking chain extender, and casting the mixture into a centrifuge for solidifying and molding. Specifically, a polyurethane prepolymer (I) (manufactured by Dainippon Ink Chemical Co., Ltd., model number: CPU-P78T, NCO % is 7.9 to 8.1%), resorcinol dihydroxyethyl ether (J), and trimethylolpropane (K) are separately heated and vacuum degassed at 90° C., then mixed and stirred at a ratio of 87:11:2 for I:J:K, and the mixture is casted to a 150° C. preheated centrifuge to have a reaction for 1 hour to obtain a 2 millimeters (mm) thick polyurethane elastomer sheet. The polyurethane elastomer sheet is rested in a normal temperature environment for three days, and then cut into rectangular pieces (PU-1) having a size of 240 mm×40 mm×2 mm and round pieces (PU-2) with a concentric center hole, the inner diameter of the center hole is 10 mm, and the outer diameter of the round piece is 180 mm.

[Polyisocyanate]

Polyisocyanate 1 (NCO-1):

A commercially available isocyanate-terminated prepolymer (manufactured by Tosoh Corporation, model number is Coronate 1333) is used as NCO-1. The NCO content of NCO-1 is 26.1%.

Polyisocyanate 2 (NCO-2): 2.50 kg of MDI (manufactured by Tosoh Corporation, model number is Millionate MT) and 2.50 kg of polyoxypropylene polyol (manufactured by Sanyo Chemical Industries, Ltd., model number is PP-1000), having a number average molecular weight of 1000 obtained from a ring-opening polymerization of propylene oxide, are stirred and mixed in a reactor and heated at 80° C. for 1.5 hours, then 2.5 kg of p-MDI (manufactured by Tosoh Corporation, model number is MR-200) is added at 60° C., the mixture is stirred for 1 hour to form NCO-2. The NCO content of NCO-2 is 18.73%.

Polyisocyanate 3 (NCO-3): MDI (L) (manufactured by Tosoh Corporation, model number is Millionate MT) and p-MDI (M) (manufactured by Tosoh Corporation, model number is MR-200) are mixed at a ratio of 20:80 for L:M and stirred at 45° C. to obtain NCO-3. The NCO content of NCO-3 is 31.52%.

Polyisocyanate 4 (NCO-4): 1.54 kg MDI (manufactured by Tosoh Corporation, model number is Millionate MT) and 0.31 kg p-MDI (manufactured by Tosoh Corporation, model number is MR-200) are mixed and stirred at 80° C., and 6.15 kg of a polyoxypropylene polyol (manufactured by Sanyo Chemical Industries, Ltd., model number is PP-1000), having a number average molecular weight of 1000 obtained from a ring-opening polymerization of propylene oxide is added, the mixture is stirred and heated at 80° C. in a reactor for 1.5 hour to form NCO-4.

The NCO content of NCO-4 is 1.22%.

[Acrylate/Methacrylate Monomer]

Pentaerythritol triacrylate (manufactured by Shin-Nakamura Chemical Co., Ltd., model number is A-TMN-3LM-N) having reactive hydroxyl groups is used as the first monomer (AC-1).

Tricyclodecane dimethanol acrylate (manufactured by Shin-Nakamura Chemical Co., Ltd., model number is A-DCP) which does not have reactive hydroxyl groups for adjusting viscosity is used as the second monomer (AC-2).

[Solvent]

The first solvent is cyclohexanone (solvent-1) or butyl acetate (solvent-2); the second solvent is cyclohexanone (solvent-1).

[Photoinitiator]

The photoinitiator of all of the following examples and comparative examples is a mixture of 2,2-dimethyl-α-hydroxyethylketone (manufactured by Nanjing Wali Chemical Technology Co., Ltd., model number is 1173) and (2,4,6-trimethylbenzoyl)diphenylphosphine oxide (manufactured by Nanjing Wali Chemical Technology Co., Ltd., model number is TPO).

[Catalyst]

In order to promote the reaction of the NCO group in the polyisocyanate with the OH group in the first monomer, dibutyltin dilaurate (DBTDL) is used as the catalyst in each of the following examples and comparative examples.

Example 1

NCO-1 and solvent-1 are mixed at a ratio of 30:70 to obtain a first coating composition. AC-1, AC-2, photoinitiator, DBTDL, and solvent-1 are mixed at a ratio of 45:30:5:0.5:19.5 to obtain a second coating composition.

The PU-1 is vertically immersed in the first coating composition for the dip-coating. A 2 mm thickness portion of the PU-1 counted from a 240 mm edge thereof is immersed in the first coating composition for 10 minutes. Then the PU-1 is lifted in the vertical direction after the dip-coating, and cleaned by a dust-free cloth to remove the first coating composition remaining on the surface of the PU-1. After that, the 2 mm thickness portion of the PU-1 counted from the 240 mm edge thereof is immersed in the second coating composition for 20 minutes. Then the PU-1 is lifted in the vertical direction after the dip-coating, and cleaned by the dust-free cloth to remove the second coating composition remaining on the surface of the PU-1. After that, it is immediately ultraviolet light solidified under a mercury lamp (wavelength is 365 nm, solidifying ultraviolet light accumulation energy is 2300 mJ/cm$^2$) to form a hardened layer.

Entire of the PU-2 is immersed in the first coating composition for 10 minutes for the dip-coating. Then the PU-2 is lifted out from the first coating composition and cleaned by a dust-free cloth to remove the first coating composition remaining on the surface of the PU-2. After that, the entire of the PU-2 is immersed in the second coating composition for the dip-coating for 20 minutes. Then the PU-2 is lifted out from the second coating composition and cleaned by the dust-free cloth to remove the second coating composition remaining on the surface of the PU-2. After that, it is immediately ultraviolet light solidified under a mercury lamp (wavelength is 365 nm, solidifying ultraviolet light accumulation energy is 2300 mJ/cm$^2$) to form a hardened layer.

Example 2

NCO-1 and solvent-2 are mixed at a ratio of 30:70 to obtain a first coating composition. AC-1, AC-2, photoinitiator, DBTDL, and solvent-1 are mixed at a ratio of 60:25:5:0.5:9.5 to obtain a second coating composition.

Hardened layers are formed on the surfaces of the PU-1 and PU-2 by using the first coating composition and the second coating composition by methods similar to those in Example 1, except that the polyurethane elastic substrate is immersed in the first coating composition for 5 minutes for the dip-coating.

Example 3

NCO-2 and solvent-1 are mixed at a ratio of 40:60 to obtain a first coating composition. AC-1, AC-2, photoinitiator, DBTDL, and solvent-1 are mixed at a ratio of 60:25:5:0.5:9.5 to obtain a second coating composition.

Hardened layers are formed on the surfaces of the PU-1 and PU-2 by using the first coating composition and the second coating composition by methods similar to those in Example 1, except that the polyurethane elastic substrate is immersed in the first coating composition for 5 minutes for the dip-coating.

Example 4

NCO-2 and solvent-2 are mixed at a ratio of 40:60 to obtain a first coating composition. AC-1, AC-2, photoinitiator, DBTDL, and solvent-1 are mixed at a ratio of 45:30:5:0.5:19.5 to obtain a second coating composition.

Hardened layers are formed on the surfaces of the PU-1 and PU-2 by using the first coating composition and the second coating composition by methods same to those in Example 1.

Comparative Example 1

The polyurethane elastic substrates PU-1 and PU-2 without any further process are directly used as samples for the wearing test.

Comparative Example 2

Only a second coating composition is applied to the surfaces of the polyurethane elastic substrates PU-1 and PU-2. Specifically, AC-1, AC-2, photoinitiator, DBTDL, and solvent-1 are mixed at a ratio of 45:30:5:0.5:19.5 to obtain the second coating composition.

The PU-1 is vertically immersed in the second coating composition for the dip-coating, having 2 mm thickness portion of the PU-1 counted from the 240 mm edge thereof immersed in the second coating composition for 20 minutes. Then the PU-1 is lifted in the vertical direction after the dip-coating, and cleaned by the dust-free cloth to remove the second coating composition remaining on the surface of the PU-1. After that, it is immediately ultraviolet light solidified under a mercury lamp (wavelength is 365 nm, solidifying ultraviolet light accumulation energy is 2300 mJ/cm$^2$) to form a hardened layer.

Entire of the PU-2 is immersed in the second coating composition for 20 minutes for the dip-coating. Then the PU-2 is lifted out from the second coating composition and cleaned by a dust-free cloth to remove the second coating composition remaining on the surface of the PU-2. After that, it is immediately ultraviolet light solidified under a mercury lamp (wavelength is 365 nm, solidifying ultraviolet light accumulation energy is 2300 mJ/cm$^2$) to form a hardened layer.

Comparative Example 3

Only a first coating composition is applied to the surfaces of the polyurethane elastic substrates PU-1 and PU-2. Specifically, NCO-1 and solvent-1 are mixed at a ratio of 30:70 to obtain a first coating composition.

The PU-1 is vertically immersed in the first coating composition for the dip-coating, having 2 mm thickness portion of the PU-1 counted from the 240 mm edge thereof immersed in the first coating composition for 10 minutes. Then the PU-1 is lifted in the vertical direction after the dip-coating, and cleaned by a dust-free cloth to remove the first coating composition remaining on the surface of the PU-1. After that, it is immediately heated at 100° C. for 60 minutes to solidify and form a hardened layer.

Entire of the PU-2 is immersed in the first coating composition for 10 minutes for the dip-coating. Then the PU-2 is lifted out from the first coating composition and cleaned by a dust-free cloth to remove the first coating composition remaining on the surface of the PU-2. After that, it is immediately heated at 100° C. for 60 minutes to solidify and form a hardened layer.

Comparative Example 4

NCO-3 and solvent-2 are mixed at a ratio of 30:70 to obtain a first coating composition. AC-1, AC-2, photoinitiator, DBTDL, and solvent-1 are mixed at a ratio of 45:30:5:0.5:19.5 to obtain a second coating composition.

Hardened layers are formed on the surfaces of the PU-1 and PU-2 by using the first coating composition and the second coating composition by methods same to those in Example 1.

Comparative Example 5

NCO-3 and solvent-2 are mixed at a ratio of 40:60 to obtain a first coating composition. AC-1, AC-2, photoinitiator, DBTDL, and solvent-1 are mixed at a ratio of 60:25:5:0.5:9.5 to obtain a second coating composition.

Hardened layers are formed on the surfaces of the PU-1 and PU-2 by using the first coating composition and the second coating composition by methods same to those in Example 1.

Comparative Example 6

NCO-4 and solvent-2 are mixed at a ratio of 20:80 to obtain a first coating composition. AC-1, AC-2, photoinitiator, DBTDL, and solvent-1 are mixed at a ratio of 45:30:5:0.5:19.5 to obtain a second coating composition.

Hardened layers are formed on the surfaces of the PU-1 and PU-2 by using the first coating composition and the second coating composition by methods same to those in Example 1.

[Hardness and Abrasion Resistance Test]

The Shore A hardnesses of the rubber substrate and the hardened layer of the samples obtained in Examples 1 to 4 and Comparative Examples 1 to 6 are respectively measured by a standard method, and the difference between the Shore A hardness of the rubber substrate and the Shore A hardness of the hardened layer is calculated.

The samples obtained in Examples 1 to 4 and Comparative Examples 1 to 6 using PU-2 as a rubber substrate are subjected to an abrasion resistance test using a Taber abraser (manufactured by Kunshan Haida Equipment Co., Ltd.) under the same conditions as follows:
Model number of abrading wheel: No. 11;
Weight load: 2 kg;
Speed: 72 round/minute (rpm);
Number of rotations: 20,000 rounds.

The percentages of change by weight of the samples before and after the test are calculated, and the results are shown in Table 1.

The samples obtained in Examples 1 to 4 and Comparative Examples 1 to 6 using PU-2 as a rubber substrate are subjected to an abrasion resistance test using a self-manufactured testing machine under the same conditions.

Figure 4:
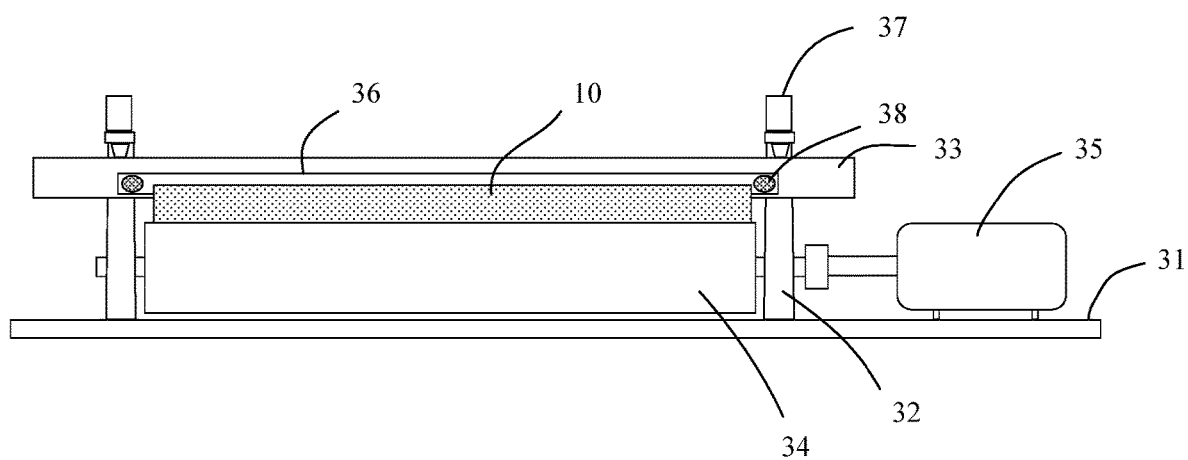
FIG. 4 is a schematic structural view of an embodiment of a wear resistance testing machine.

Referring to FIG. 4, the self-manufactured testing machine includes a platform 31, a vertical bracket 32 disposed on the platform 31, a horizontal bracket 33, a cylindrical metal roller 34, a motor 35, a fixing plate 36, a position adjusting member 37, and a fixing member 38. Both ends of the metal roller 34 are supported by the vertical bracket 32, and are axially parallel to the platform 31. The motor 35 is coupled to a central axis of the metal roller 34 to enable the metal roller to rotate at a constant speed. The fixing plate 36 is bonded and fixed to the sample, specifically, bonded to the end of the rubber substrate away from the hardened layer. Both ends of the fixing plate 36 are fixed to the horizontal bracket 33 by the fixing members 38, and the hardened layer is brought into contact with the metal roller 34. The position adjusting member 37 can adjust the position and angle of the horizontal bracket 33 to adjust a contact angle between the sample with the metal roller 34 and a deformation amount of the sample. The structure of the self-manufactured testing machine can better simulate a working condition of the rubber blade used in an image forming apparatus.

The samples of Examples 1 to 4 and Comparative Examples 1 to 6 are subjected to the abrasion resistance test using the self-manufactured testing machine. Specifically, the edge of the hardened layer is previously confirmed that is smooth and unnotched using a laser scanning microscope (manufactured by KEYENCE, model number is VK-8700). Then, the sample is mounted on the self-manufactured testing machine. The angle between the surface of the hardened layer and the surface of the metal roller 34 is adjusted to 15° by the position adjusting member 37. The pressing amount of the sample against the surface of the metal roller 34 is 1 mm. The roller 34 is rotated at a constant speed of 190 rpm for 20 minutes, a total of 3800 rounds, equivalent to 430 meters stroke. The sample is then taken off from the testing machine, and a wear depth of the sample is measured in unit of μm. Degrees of a flipping broken and an edge notch are also recorded. The flipping broken is the flipping and lift up of the location of the sample that in contact with the metal roller 34. The edge notch is the notch on the edge and the surface of the hardened layer. The results are shown in Table 1.

TABLE 1

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| First coating composition | Polyisocyanate (a) | NCO-1 | NCO-1 | NCO-2 | NCO-2 | — | — | NCO-1 | NCO-3 | NCO-3 | NCO-4 |
| | First solvent (b) | solvent-1 | solvent-2 | solvent-1 | solvent-2 | — | — | solvent-1 | solvent-2 | solvent-2 | solvent-2 |
| | Ratio (a)/(b) | 30/70 | 30/70 | 40/60 | 40/60 | — | — | 30/70 | 30/70 | 40/60 | 20/80 |
| | Dip-coating time for rubber substrate (min) | 10 | 5 | 5 | 10 | — | — | 10 | 10 | 10 | 10 |
| Second coating composition | AC-1 | 45 | 60 | 60 | 45 | — | 45 | — | 45 | 60 | 45 |
| | AC-2 | 30 | 25 | 25 | 30 | — | 30 | — | 30 | 30 | 30 |
| | photoinitiator | 5 | 5 | 5 | 5 | — | 5 | — | 5 | 5 | 5 |
| | second solvent (solvent-1) | 20 | 10 | 10 | 20 | — | 20 | — | 20 | 5 | 20 |
| | Dip-coating | 20 | 20 | 20 | 20 | — | 20 | — | 20 | 20 | 20 |

TABLE 1-continued

|  |  | Example | | | | Comparative Example | | | | | |
|---|---|---|---|---|---|---|---|---|---|---|---|
|  |  | 1 | 2 | 3 | 4 | 1 | 2 | 3 | 4 | 5 | 6 |
| A Hardness | time for rubber substrate (min) | | | | | | | | | | |
|  | Hardness of rubber substrate (Shore A) | 74 | 74 | 74 | 74 | 74 | 74 | 74 | 74 | 74 | 74 |
|  | Hardness of dip-coating surface (Shore A) | 75 | 77 | 76 | 75 | — | 79 | 74 | 80 | 80 | 75 |
|  | Hardness difference (%) | 1 | 4 | 3 | 1 | — | 7 | 0 | 8 | 8 | 1 |
| Taber test | Weight change (wt %) | 0.062 | 0.058 | 0.052 | 0.069 | 0.171 | 0.115 | 0.150 | 0.146 | 0.153 | 0.137 |
| Self-manu-factured testing machine | Flipping broken | ○ | ○ | ○ | ○ | × | ○ | ○ | ○ | ○ | ○ |
|  | Edge notch | ○ | ○ | ○ | ○ | × | Δ | × | × | × | Δ |

In Table 1, ○ means good, Δ means general, X means poor.

Through the hardness and abrasion resistance tests, it can be seen that all of Examples 1-4 can improve the abrasion resistance of the rubber blade while improving the conformability. The untreated rubber blade sample of Comparative Example 1 shows a flipping broken due to the large friction coefficient of the surface of the elastic substrate. The rubber blade samples treated with only the first coating composition or the second coating composition in Comparative Examples 2 and 3, due to high hardness and poor abrasion resistance, also produce a degree of edge notch. Since NCO-3 in Comparative Examples 4 and 5 is not modified by polyol, the NCO content is high, the hardness is high, the conformability is poor, and the edge notch problem is serious.

The rubber blade has an excellent abrasion resistance at the edge region of the working surface and a long lifetime. The hardened layer has a good conformability to the rubber substrate. The rubber blade is suitable for the field requiring a high precision and high durability rubber blade, such as the cleaning of the toner adhered on a photosensitive drum of a laser printer.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a rubber blade, comprising:
applying a first coating composition and a second coating composition in separate steps on at least a part of a surface of a polyurethane elastic substrate, wherein
the first coating composition comprises an isocyanate-group-terminated polyisocyanate and a first solvent, a weight percentage of NCO in the polyisocyanate is 5% to 30%, a weight ratio of the polyisocyanate to the first solvent is 90:10 to 10:90,
the second coating composition comprises a first monomer, a photoinitiator, and a second solvent, and the first monomer is at least one of an acrylate monomer and a methacrylate monomer each having an reactive hydroxyl group, a weight ratio of the first monomer to the second solvent is 70:30 to 95:5;
reacting the isocyanate group of the polyisocyanate with the reactive hydroxyl group of the first monomer to generate an urethane group to form a polyurethane acrylate; and
solidifying the first coating composition and the second coating composition by ultraviolet light irradiating to form a hardened layer on the surface of the polyurethane elastic substrate.

2. The method of claim 1, wherein the polyisocyanate is a prepolymer obtained by reacting an isocyanate monomer with a polymer polyol, a number average molecular weight of the polymer polyol is less than or equal to 8000.

3. The method of claim 2, wherein the number average molecular weight of the polymer polyol is 200 to 4000.

4. The method of claim 2, wherein the polymer polyol comprises at least one of polyoxyalkylene polyol and polyester polyol.

5. The method of claim 2, wherein a functionality of the polymer polyol is 2 to 5.

6. The method of claim 1, wherein the second coating composition further comprises a second monomer, the second monomer is at least one of an acrylate monomer and a methacrylate monomer each not having any reactive hydroxyl group.

7. The method of claim 1, wherein the applying the first coating composition and the second coating composition in separate steps on at least a part of the surface of the polyurethane elastic substrate comprises:
firstly applying the first coating composition on the surface, and then applying the second coating composition on the surface having the first coating composition; or
firstly applying the second coating composition on the surface, and then applying the first coating composition on the surface having the second coating composition.

8. The method of claim 1, after applying one and before applying another of the first coating composition and the second coating composition, further comprising:
removing an excess coating composition from the surface.

9. The method of claim 1, wherein the applying is respectively dip-coating the surface of the polyurethane elastic substrate with the first coating composition and the second coating composition.

10. The method of claim 9, wherein the surface of the polyurethane elastic substrate is stayed in the first coating composition and the second coating composition for 1 minute to 60 minutes.

11. The method of claim 1, wherein the reacting the isocyanate group with the reactive hydroxyl group and the solidifying the polyurethane acrylate are proceeded in a same ultraviolet light irradiating step in heat generated by the ultraviolet light irradiating.

12. The method of claim 1, wherein at least one of the first coating composition and the second coating composition is applied at a temperature above room temperature.

13. The method of claim 1, wherein the polyurethane elastic substrate has an edge configured to be in contact with an operating target surface, the at least a part of the surface is adjacent to the edge.

* * * * *